United States Patent
Klarner et al.

(10) Patent No.: US 6,888,908 B1
(45) Date of Patent: *May 3, 2005

(54) REACTOR HEAD WITH INTEGRAL NOZZLES

(75) Inventors: Richard G. Klarner, Georgetown (CA); Jun Tang, Cambridge (CA)

(73) Assignee: Babcock & Wilcox Canada, Ltd., Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/298,856

(22) Filed: Nov. 18, 2002

(51) Int. Cl.[7] .............................................. G21C 13/00
(52) U.S. Cl. ...................... 376/205; 376/294; 376/203
(58) Field of Search ................................. 376/205, 294, 376/204, 203, 260, 327, 233, 310, 265, 401, 366, 368

(56) References Cited

U.S. PATENT DOCUMENTS

| | | | |
|---|---|---|---|
| 4,053,080 A | * 10/1977 | Daublebsky ................. 220/586 |
| 4,057,163 A | * 11/1977 | Widart et al. ................ 376/294 |
| 4,421,714 A | 12/1983 | Dronkers | |
| 4,521,370 A | * 6/1985 | Fischer et al. ............... 276/233 |
| 4,602,767 A | * 7/1986 | Spiegelman et al. ........... 266/87 |
| 5,009,838 A | * 4/1991 | Shioyama et al. ............ 376/310 |
| 5,130,080 A | * 7/1992 | Niedrach ..................... 376/305 |
| 5,135,709 A | * 8/1992 | Andresen et al. ............ 376/305 |
| 5,196,160 A | 3/1993 | Porowski | |
| 5,207,977 A | * 5/1993 | Desai .......................... 376/294 |
| 5,404,382 A | 4/1995 | Russ et al. | |
| 5,426,675 A | * 6/1995 | Kumar et al. ................ 376/203 |
| 5,516,999 A | 5/1996 | Fournier | |
| 5,544,209 A | 8/1996 | Michaut et al. | |
| 5,661,767 A | 8/1997 | Roux | |
| 5,700,988 A | 12/1997 | Fournier | |
| 5,721,758 A | * 2/1998 | Fife et al. ..................... 376/294 |
| 5,818,893 A | * 10/1998 | Hettiarachchi .............. 376/305 |
| 6,188,741 B1 | 2/2001 | Ballas et al. | |
| 6,426,986 B1 | * 7/2002 | Fife et al. ..................... 376/294 |
| 6,504,888 B1 | * 1/2003 | Fife et al. ..................... 376/246 |

OTHER PUBLICATIONS

*Steam, Its Generation and Use*, 39th Edition, The Babcock & Wilcox Company, ©1978, p. 31–17 to 31–18.
*Steam, Its Generation and Use*, 40th Edition, The Babcock & Wilcox Company, ©1992, p. 50–1 to 50–3.

* cited by examiner

*Primary Examiner*—Michael J. Carone
*Assistant Examiner*—R Palabrica
(74) *Attorney, Agent, or Firm*—Michael J. Seymour; Eric Marich; Kathryn W. Grant

(57) ABSTRACT

A reactor closure head assembly has guide tube nozzles which are integral with the reactor closure head. A dome-shaped forging having a concave surface is prepared with extra thickness equal to or greater than the desired nozzle height. Nozzles having bores therethrough are machined opposite the concave surface. Weld buttering is applied to the ends of the nozzles, the concave surface is clad with a corrosion resistant layer, and the forging is then heat treated. A guide tube flange is attached to the ends of the nozzles. The surfaces of the nozzle bores are covered with a protective layer which is preferably applied without heating, for example by electrochemical deposition, thereby avoiding the need for subsequent post weld heat treatment.

14 Claims, 2 Drawing Sheets

REACTOR HEAD WITH INTEGRAL NOZZLES

FIELD AND BACKGROUND OF INVENTION

The present invention relates to nuclear power plant systems and more particularly to a nozzle penetration arrangement for a nuclear reactor pressure vessel closure head, such as a control rod drive mechanism (CRDM) guide tube nozzle penetration, and methods of making them.

A pressurized water nuclear reactor (PWR) includes a lower reactor vessel with a reactor core and an upper control rod assembly, part of which can be lowered into the reactor vessel for controlling the reaction rate of the nuclear reactor. The control rod assembly contains a plurality of vertical nozzles which penetrate the upper cover of the vessel, or closure head, and houses extensions of a control rod, that can be lifted or lowered by a control rod drive mechanism ('CRDM'), which generally operates by some combination of electrical, electromechanical, hydraulic, or pneumatic motors or drivers. For further details of the design and operation of pressurized water reactors the reader is referred to Chapters 47 and 50 of Steam/its generation and use, $40^{th}$ Edition, Stultz and Kitto, Eds., Copyright ©1992, The Babcock & Wilcox Company, the text of which is hereby incorporated by reference as though fully set forth herein.

As shown in FIG. 1, designs for a PWR closure head assembly 5 presently used throughout the industry include a reactor head flange 10 which surrounds and may be integral with closure head 20 that forms a hemispherical, dome-shaped pressure boundary. Control Rod Drive Mechanism (CRDM) guide tubes 30, also referred to as the CRDM housing, CRDM nozzles, mech housing or Control Element Drive Mechanism (CEDM) nozzles, pass through and are attached to closure head 20. A stainless steel flange or adaptor 40 is situated at the upper end of the guide tube 30 attachment of each CRDM or CEDM, via full penetration weld 70 shown in FIG. 2. A PWR closure head assembly 5 is a large, heavy structure, typically about 17 feet in diameter and weighing about 90 tons, and includes between 30–100 CRDM guide tubes 30.

Referring to FIG. 2, guide tube 30 is manufactured separately from closure head 20, and then installed in bore hole 22 extending through closure head 20 from concave inner surface 24 to convex outer surface 26. As shown in FIG. 2, guide tube 30 protrudes beyond inner surface 24 and outer surface 26. Closure head 20 is typically fabricated from low-alloy steel and provided with a corrosion resistant cladding 80, such as 308/309 stainless steel, at inner surface 24.

Guide tube 30 is attached to closure head 20 by welding the guide tube 30 to closure head 20 with a partial penetration weld 50 referred to as a 'J' groove weld. Guide tube 30 is typically fabricated from Inconel Alloy 600 or Inconel Alloy 690, in which case weld 50 is made using Inconel weld consumables. Partial penetration J groove weld 50 is made between guide tube 30 and a J groove weld preparation profile 52 formed at inner surface 24 and typically covered with a previously heat treated Inconel overlay, in what is known as J groove buttering 60. The previously heat treated J groove buttering 60 allows welding of the guide tube 30 to the buttering 60 without subsequent heat treatment of the J groove attachment weld 50.

J groove attachment weld 50 and the associated guide tube 30 have experienced life limiting degradation in the vicinity of the J groove attachment region attributed to stress corrosion cracking (SCC). This has forced the repair, replacement or inspection of the Inconel J groove weld 50 and guide tubes 30. This degradation has become a commercial and safety concern for all operating PWR stations. A reactor closure head assembly which eliminates the J groove attachment welds between the guide tubes and the inner surface of the reactor closure head would therefore be welcomed by industry.

SUMMARY OF INVENTION

The present invention is drawn to method and apparatus for eliminating degradation mechanism classified as stress corrosion cracking on the 'J' groove weld, and consequently eliminates the inspection and potential repair on the 'J' groove welds as commonly occurring in many PWR stations.

Accordingly, one object of the invention to minimize stress corrosion cracking of a reactor closure head assembly.

Another object of the invention is to eliminate nozzle welds exposed to reactor coolant.

In one embodiment, the invention comprises a closure head assembly for a reactor pressure vessel. The assembly includes a closure head which has a concave inner surface and a convex outer surface and is made of a first material. The assembly has plurality of nozzles integral with the closure head. Each nozzle terminates in a nozzle tip and has a bore therethrough defining a bore surface extending from the inner surface of the closure head to the nozzle tip. A corrosion-resistant second material is established adjacent to each bore surface.

In another embodiment, the invention comprises a closure head assembly for a reactor pressure vessel. The assembly includes a closure head which is made of first material and has a concave inner surface and a convex outer surface. The closure head inner surface is clad with a corrosion-resistant second material. The assembly also includes a plurality of control rod guide tube nozzles. Each nozzle is integral with the closure head and terminates in a nozzle tip. Each nozzle also has a bore therethrough defining a bore surface extending from the inner surface of the closure head to a nozzle tip. A control rod guide tube flange is attached to each nozzle end tip with weld buttering therebetween. A corrosion-resistant third material is established adjacent the bore surfaces.

In yet another embodiment, the invention comprises a method of making a reactor closure head assembly. The assembly has a reactor closure head with a plurality of nozzles arranged about the closure head. Each nozzle is integral with the closure head and has a bore therethrough. The bores of the outermost nozzles define a maximum bore length. The method includes providing a dome-shaped forging having a concave surface and a thickness greater than the maximum bore length. A plurality of nozzle protrusions are machined from the forging and an associated plurality of bores are formed therethrough. Each bore has a bore surface extending from the concave surface and terminating in a nozzle tip.

In a still further embodiment, the invention comprises a method of making a reactor closure head assembly. The assembly has a reactor closure head with a plurality of nozzles arranged about the closure head. Each nozzle is integral with the closure head and has a bore therethrough. The bores of the outermost nozzles defining a maximum bore length. The method includes providing a dome-shaped forging having a concave surface and a thickness greater than the maximum bore length. A plurality of nozzle protrusions are machined from the forging and an associated plurality of bores are formed therethrough. Each bore has a bore surface extending from the concave surface and terminating in a nozzle tip. The concave surface is clad with a corrosion resistant layer, weld buttering is applied to the nozzle tips and the forging, including the corrosion resistant layer and the weld buttering, is heat treated. A control rod guide tube flange is attached to each nozzle tip adjacent the weld buttering. A protective layer is established adjacent each bore surface.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

The subject invention addresses the observed degradation of the prior art by eliminating the 'J' groove attachment weld 50 which creates detrimental residual stresses. The invention further eliminates the separate Inconel guide tube 30 which, along with the Inconel 'J' groove weld consumable, are materials susceptible to degradation by stress corrosion cracking.

Figure 1:
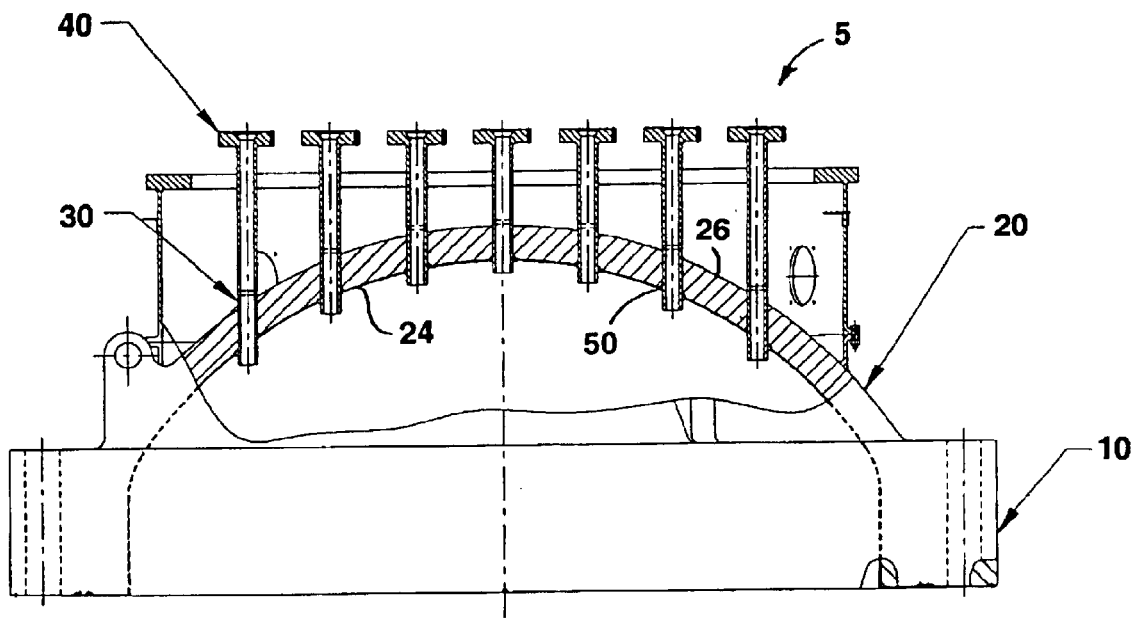
FIG. 1 is a schematic, sectional view of a known reactor pressure vessel closure head assembly.
Figure 2:
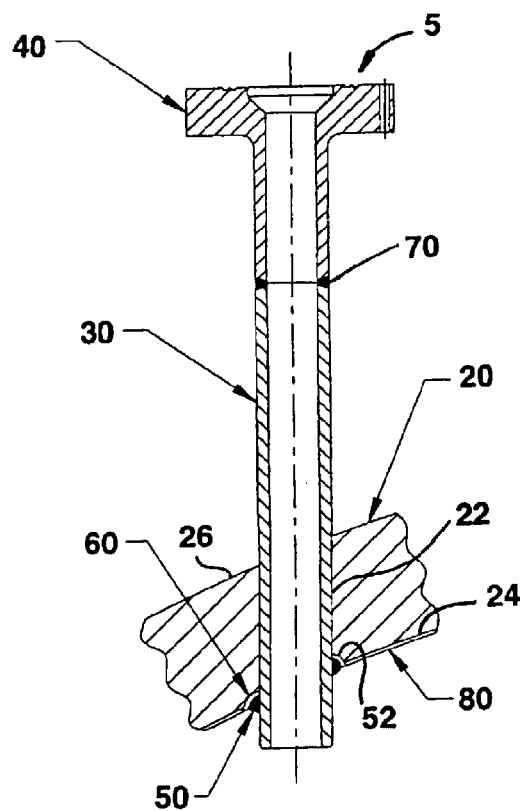
FIG. 2 is an enlarged partial sectional view of a nozzle penetration arrangement used in a known vessel closure head assembly.
Figure 3:
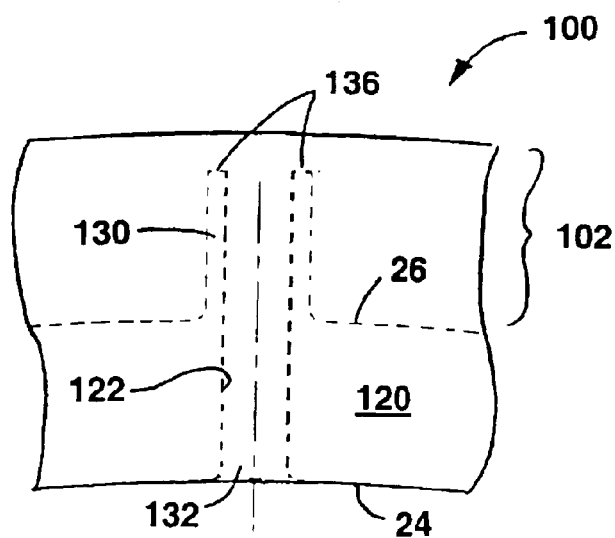
FIG. 3 is a partial sectional view of a forging used in manufacturing the nozzle penetration arrangement of the present invention.
Figure 4:
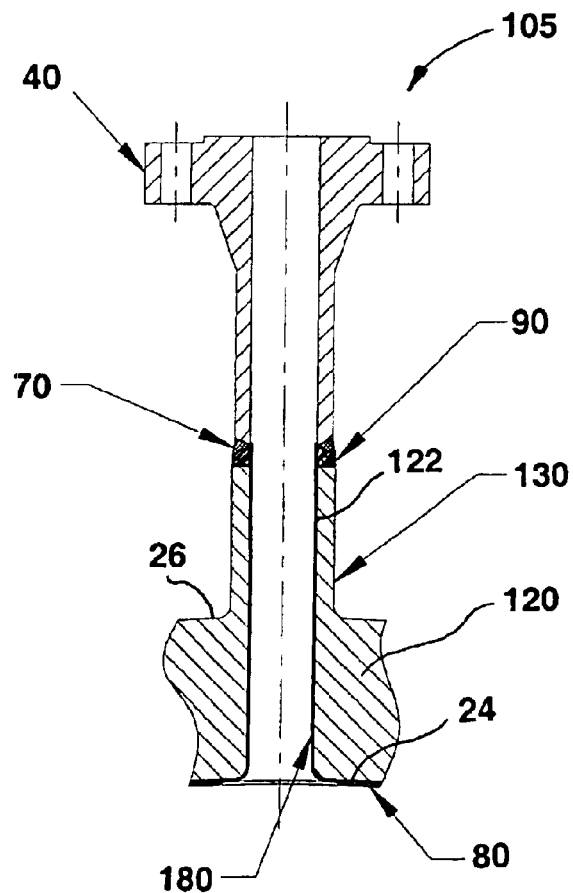
FIG. 4 is a partial sectional view of a nozzle penetration arrangement according to the invention.

Referring to FIGS. 3 and 4, the subject invention provides a closure head assembly 105 having guide tube nozzles 130 which are integral with reactor closure head 120, thereby eliminating both separately installed guide tubes and associated attachment welds. As shown in FIG. 3, a dome-shaped, reactor head pressure boundary forging 100, having a concave inner surface 24 is processed with extra thickness 102, equal to or greater than the desired nozzle height. This allows machining of nozzle protrusions farmed as an integral part of the forged, dome-shaped reactor closure head 120. Convex outer surface 26 is formed as part of the machining process. A bore 132 is formed through each nozzle protrusion to form an integral guide tube nozzle 130 which extends beyond outer surface 26 and terminates in nozzle tip 136. Bore 132 has a bore surface 122 extending from inner surface 24 to nozzle tip 136. This complex forged shape is thermally-treated in compliance with the forged material requirements, if needed.

As shown in FIG. 4, the inner surface 24 of the reactor closure head 120 is clad with a corrosion resistant cladding layer 80 of weld consumables, such as 308 and 309 stainless steel or a nickel-chromium alloy like an Inconel alloy, applied using weld cladding methods known in the art. Cladding layer 80 shields the carbon steel or low alloy forged closure head 120 from the borated reactor coolant fluid.

Nozzle weld buttering 90 is applied to nozzle tips 136 of integral guide tube nozzles 130 using a stainless or Inconel consumable. The partially completed closure head assembly 105, including reactor closure head 120, the cladding layer 80 on inner surface 24 and the nozzle weld buttering 90 at safe ends of integral guide tube nozzles 130, is then heat treated in accordance with the requirements of the ASME code.

A guide tube flange or adaptor 40 is then attached to each integral guide tube nozzle 30 via a full penetration weld 70 at the end tip 136 adjacent nozzle weld buttering 90. This attachment weld can be performed following the above-mentioned ASME code heat treatment, and advantageously does not require any further post weld heat treatments.

The bore surface 134 of the integral guide tube nozzle 130 is then covered with a protective layer 180, designed to shield the carbon or low alloy steel forging material from the reactor coolant fluid. Protective layer 180 is applied to bore surface 122, extending from cladding layer 80 on inner surface 24 up to full penetration weld 70. Protective layer 180 can be applied by processes involving heating, for example via weld cladding methods known in the art, which require subsequent post weld heat treatment. Protective layer 180, however, is preferably applied without heating, for example via electrochemical deposition, thereby eliminating the need for subsequent post weld heat treatment. U.S. Pat. Nos. 5,352,266; 5,433,797; 5,516,415; 5,527,445; and 5,538,615 describe a pulsed electrodeposition process which is suitable for this purpose, and are incorporated herein by reference as though fully set forth. This pulsed electrodeposition process can be used to deposit, for example, a 0.020 inch thick protective metallic layer, such as nickel, on bore surface 122. Other suitable materials for protective layer 180 include stainless steel, nickel-based alloys, and nickel-chromium alloys such as Inconel.

Alternatively, protective layer 180 could be established by introducing a sleeve of a corrosion resistant material into bore 132 adjacent bore surface 122. As one example, a sleeve of corrosion resistant material having a diameter slightly greater than bore 132 is chilled to reduce the diameter of the sleeve, for example by exposure to liquid nitrogen, and the sleeve is inserted into bore 132. The sleeve expands as it returns to room temperature, thereby forming an expansion-fit with bore surface 122. Other means of establishing a protective layer 180 by way of a sleeve are also possible. The sleeve may or may not be bonded to bore surface 122.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

We claim:

1. A method of making a reactor upper closure head assembly for a pressurized water reactor, the assembly having a reactor closure head with a plurality of control rod guide tube nozzles arranged about the closure head for housing movable control rod extensions therethrough, each guide tube nozzle being integral with the closure head and having a bore extending therethrough, at least some of the bores being of differing length, with the outermost guide tube nozzles defining a maximum bore length, comprising:

provide a dome-shaped forging having a concave inner surface and a thickness greater than the maximum bore length;

machining a convex outer surface and all the plurality of guide tube nozzles from the forging the guide tube nozzles projecting upward beyond the convex outer surface; and forming the associated plurality of bores through said plurality of guide tube nozzles, each bore having a bore surface extending from the concave surface and terminating in a nozzle tip.

2. The method of claim 1, further comprising heat treating the reactor closure head.

3. The method of claim 1, further comprising establishing a protective layer adjacent each bore surface.

4. The method of claim 3, further comprising applying a protective layer to each bore surface without heating.

5. The method of claim 3, further comprising applying a protective layer to each bore surface via electrochemical deposition.

6. The method of claim 1, further comprising cladding the concave surface with a corrosion resistant layer.

7. The method of claim 6, further comprising applying weld buttering to the nozzle tips.

8. The method of claim 7, further comprising heat treating the reactor closure head, corrosion resistant layer and weld buttering.

9. The method of claim 8, further comprising attaching a control rod guide tube flange to each nozzle tip adjacent the weld buttering.

10. The method of claim 1, wherein the machined guide tube nozzles number between thirty to one hundred.

11. A method of making a reactor upper closure head assembly for a pressurized water reactor, the assembly having a reactor closure head with a plurality of control rod guide tube nozzles arranged about the closure head for housing movable control rod extensions therethrough, each nozzle being integral with the closure head and having a bore extending therethrough, at least some of the bores being of differing length, with the outermost guide tube nozzles defining a maximum bore length, comprising:

providing a dome-shaped forging having a concave inner surface and a thickness greater than the maximum bore length;

machining a convex outer surface and the plurality of guide tube nozzles from the forging, the guide tube nozzles projecting upward beyond the convex outer surface and forming the associated plurality of bores therethrough, each bore having a bore surface extending from the concave surface and terminating in a nozzle tip;

cladding the concave surface with a corrosion resistant layer;

applying weld buttering to the nozzle tips;

heat treating the reactor closure head, corrosion resistant layer and weld buttering;

attaching a control rod guide tube flange to each nozzle tip adjacent the weld buttering; and establishing a protective layer adjacent each bore surface.

12. The method of claim 11, further comprising applying a protective layer to each bore surface without heating.

13. The method of claim 11, further comprising applying a protective layer to each bore surface via electrochemical deposition.

14. The method of claim 11, wherein the machined guide tube nozzles number between thirty to one hundred.

* * * * *